United States Patent [19]
Salecker et al.

[11] Patent Number: 5,983,740
[45] Date of Patent: *Nov. 16, 1999

[54] APPARATUS AND METHOD FOR CONTROLLING A TORQUE TRANSMITTING SYSTEM AND A TRANSMISSION USING WHEEL SPEED SENSOR FOR ENGINE RPM

[75] Inventors: Michael Salecker, Bühl; Jochen Stinus, Achern, both of Germany

[73] Assignee: LuK Getriebe-Systeme GmbH, Buhl, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/816,168

[22] Filed: Mar. 12, 1997

[30] Foreign Application Priority Data

Mar. 14, 1996 [DE] Germany ............................ 196 09 957

[51] Int. Cl.[6] .................................................. B60K 41/06
[52] U.S. Cl. ........................... 74/336 R; 74/335; 477/109; 477/124
[58] Field of Search ..................................... 477/109, 120, 477/107, 124, 125; 74/335, 336; 701/67

[56] References Cited

U.S. PATENT DOCUMENTS

| | | | |
|---|---|---|---|
| 4,727,472 | 2/1988 | Deutsch et al. | 477/124 X |
| 4,860,607 | 8/1989 | Numazawa et al. | 74/336 X |
| 4,884,667 | 12/1989 | Koga | 74/336 X |
| 5,042,327 | 8/1991 | Stainton | 74/336 X |
| 5,172,602 | 12/1992 | Jurgens et al. | 74/335 |
| 5,335,568 | 8/1994 | Kammerl et al. | 477/109 |
| 5,343,781 | 9/1994 | Minowa et al. | 477/107 |
| 5,481,456 | 1/1996 | Ogura | 477/97 X |
| 5,509,867 | 4/1996 | Genise | 477/120 |
| 5,568,748 | 10/1996 | Carlson et al. | 477/120 X |
| 5,580,331 | 12/1996 | Shirashi et al. | 477/109 |
| 5,582,069 | 12/1996 | Genise | 477/120 X |
| 5,620,392 | 4/1997 | Genise | 477/120 |
| 5,688,205 | 11/1997 | Buhler | 477/124 X |
| 5,754,968 | 5/1998 | Hedstrom | 74/336 R X |
| 5,771,477 | 6/1998 | Showalter et al. | 701/67 X |

*Primary Examiner*—Khoi Q. Ta
*Attorney, Agent, or Firm*—Darby & Darby

[57] ABSTRACT

The present invention relates to an apparatus and a method for controlling the operation of an engageable and disengable torque transmitting system and of an automated transmission that is connected to a differential and to the torque transmitting system by an input shaft. The system and the transmission are disposed in a power train of a motor vehicle having variable-speed drive unit, and the transmission is shiftable into any one of a plurality of gears. The torque transmitting system and the automated transmission comprise a control unit and at least one actuator arranged to vary the extent of engagement of the torque transmitting system and to shift the transmission into a selected gear. Further, there are means for transmitting signals between the control unit and the drive unit to controllably reduce the speed of said drive unit in response to at least one initial stage of automated shifting of said transmission into a selected gear and to controllably increase the speed of said drive unit during a next-following stage of automated shifting of said transmission into said selected gear.

20 Claims, 4 Drawing Sheets

APPARATUS AND METHOD FOR CONTROLLING A TORQUE TRANSMITTING SYSTEM AND A TRANSMISSION USING WHEEL SPEED SENSOR FOR ENGINE RPM

BACKGROUND OF THE INVENTION

The invention relates to an apparatus for controlling a torque transmitting system and a transmission in a power train of an automobile, with a drive unit, such as an engine, with a torque transmitting system, a transmission, with a control unit and at least one actuator, wherein the control unit controls the at least one actuator for operating the torque transmitting system as well as for shifting the gear ratio of the transmission, wherein the control unit is in signal-transmitting communication with at least one sensor and, if necessary, with other electronic modules, for example with an engine electronic module. The invention also relates to a method therefor.

Devices of this type are employed, for example, in automobiles. In vehicles equipped with these devices and having transmissions with traction interruption and in vehicles with manually shifted gear change boxes and a foot-operated clutch or torque transmitting system, the rotational speed of the engine is matched after the shifting operation by engaging the torque transmitting system; this method for matching the rotational speed is quite uncomfortable.

By accelerating rotational masses, for example in the engine, and by decelerating rotational masses during the up- and down-shift operation, meaning that the gear ratio of the transmission after the shifting operation is smaller or greater than before the shifting operation, there acts an at least temporary force on the vehicle and on the occupants of the vehicle, whereby this force contributes to a jumpy acceleration and braking. These jolts and jumpy movements are regarded as annoying by the automobile occupant.

SUMMARY OF THE INVENTION

It is an object of the invention to provide a device of the aforedescribed type which provides a comfortable ride especially when gear changes are performed. It is another object of the invention to provide such a device in a simple and cost-effective manner, while still achieving and ensuring an essential comfort level and improving over other systems. It is especially advantageous, if such device can be manufactured at reduced cost by reducing the number of components.

This is achieved in accordance with the present invention in that during a controlled automatic shifting operation of the gear ratio executed with the actuator(s), at least during its initial phase, the rotational speed of the drive unit is purposely decreased by controlling, for example, an engine electronic module by way of the control unit, and during a second phase the rotational speed of the drive unit is purposely increased by controlling, for example, an engine electronic module by way of the control unit. The increase can continue until a presettable set-point is reached, such as a target speed, wherein the presettable set-point is related to the transmission input of the rotational speed.

It may be particularly advantageous if the control unit controls at least one actuator for performing the shifting operation of the gear transmission in that the actuator actuates transmission-internal shifting elements and in that the control unit controls the engine electronics directly or indirectly in such a way that the rotational speed of the drive unit is purposely decreased during a first phase and purposely increased during a second phase.

It is another object to provide an automatic shifting operation of the gear transmission in a down-shift operation, wherein the gear ratio after the shifting operation is substantially greater than before the shifting operation. A shifting operation into the same gear with the same gear ratio may also be considered to be part of a shifting operation of this type.

It is advantageous if the automatic shifting operation of the gear ratio is an up-shift operation, wherein the gear ratio after the shifting operation is essentially smaller than before the shifting operation.

According to another object of the invention, it may also be advantageous if the rotational speed of the engine and/or the engine torque is purposely reduced by the control unit before the controlled operation of the transmission-internal shifting elements and/or before the disengagement of the torque transmitting system by the actuator(s). This is advantageous since potentially uncomfortable noises from revving up the engine are eliminated.

It is also advantageous if for reducing the engine speed or engine torque, the control unit controls the engine electronics which then reduces the engine speed of engine torque. This may, for example, be accomplished by actively affecting the throttle valve and/or the fuel-air-ratio, the ignition timing, the injection time, the injected fuel volume, the camshaft setting as well as possibly other engine parameters.

It may furthermore be advantageous if the control unit directly or indirectly controls the engine electronics, whereby the engine speed is changed, such as decreased or increased.

Another advantage is that the engine electronics is indirectly controlled through an additional electronic unit connected in series, such as a transmission electronics. It may also be advantageous if the engine electronics is indirectly controlled in such a way that the control unit is in signal-transmitting communication with an additional electronic unit, such as a transmission control electronics, receiving control signals from the control unit, wherein said additional electronic unit controls the engine electronics for changing, such as decreasing or increasing, the engine speed of the drive unit, wherein one of the electronic units operates as a master unit and the other electronic units operate as slave units. The designations master unit and slave units refer to the rank order and relative weights of the electronic units when several electronic units mutually cooperate. The slave units are electronic units which are in signal-transmitting communication with the master unit and possibly with each other, by providing signals to the master unit for analysis by the master unit which uses these signals to initiate control processes for controlling other electronic units, such as slave units. The master unit is the main control unit and the slave units are hierarchically subordinate.

Another advantage of the invention may be that during an automatic shifting operation, the torque transmitting system is controllably disengaged at an at least slightly decreased engine speed and is at least essentially controllably re-engaged, before or after the shifting operation has ended, during or after the controlled increase of the speed of the drive unit. It is also advantageous if the engine speed is essentially controllably changed, i.e. increased or decreased, to a presettable desired value, wherein the presettable set point is determined (calculated) by the control unit.

It is furthermore advantageous if the desired value of the drive unit speed is calculated from at least one wheel rotation speed value WHEEL_ROT and the power train gear ratio, such as differential gear ratio $i_{DIFF}$, as well as the gear ratio $i_{TRANS}$ of the actually provided gear ratio of the transmission.

It is also advantageous if the wheel rotation speed values used for calculating the desired value of the engine speed originate from at least one wheel. The wheel rotation speed values WHEEL_ROT may also be determined (calculated) from averaged wheel rotation speeds.

It is also advantageous if the wheel rotation speed values used for calculating the desired value of the engine speed are wheel rotation speed values obtained by using averaged wheel rotation speed values from at least two wheels. In particular, it is advantageous if the wheel rotation speed values from powered wheels are employed.

Another advantageous feature of the invention may be if the engine speed is increased to a presettable desired value during a second phase, whereby the increase of the engine speed is controlled by the control unit. It may also be advantageous if the engine speed is used as a control or controlling variable and the control unit sets the torque of the drive unit, such as an engine, as desired value.

It may also be advantageous if the control unit or controlling means determines as an initial desired value the engine torque from a map or a characteristic curve and from an error signal or a desired value.

It may furthermore be advantageous if the control unit or controlling means determines the desired value of the engine torque from an input value based on mathematical preset functions and on an error signal or a presettable desired value.

According to another object to the invention, it may be advantageous to provide a method for controlling a torque transmitting system and a transmission in the power train of an automobile comprising an engine, a torque transmitting system and a transmission, a control unit and an actuator(s) for operating the torque transmitting system and for shifting the gear ratio of the transmission, wherein the control unit controls the actuator(s) for operating the torque transmitting system and for shifting the gear ratio of the transmission, wherein the control unit is in signal-transmitting communication with a sensor(s) and, if necessary, with other electronic units, and wherein when a signal is present indicating the intent to shift, the control unit controls an engine electronics in such a way that the engine speed is reduced, that the torque transmitting system at an at least partially reduced engine speed is disengaged through an actuator(s), that the control unit executes the shifting operation with at least one actuator and controls the engine electronics substantially before or after the shifting operation ends, but at least essentially before the torque transmitting system engages, such that the engine speed is essentially controlled to match the input speed of the transmission.

It may further be advantageous if for a down-shift operation, where the transmission gear ratio after the shifting operation is larger than before the shifting operation, the engine speed is increased substantially at least before engaging the torque transmitting system to essentially the input speed of the transmission. It may also be advantageous if for a down-shift operation, where the transmission gear ratio after the shifting operation is smaller than before the shifting operation, the engine speed is adjusted substantially at least before engaging the torque transmitting system to essentially match the input speed of the transmission.

In an apparatus for controlling a torque transmitting system, such as a clutch, and a transmission in the power train of an automobile, the power train includes a drive unit, such as an engine, a torque transmitting system, a transmission, a control unit and an actuator(s), wherein the control unit controls an actuator(s) for operating the torque transmitting system as well as for shifting the gear ratio of the transmission, wherein the control unit is in signal-transmitting communication with an sensor(s) and, if desired, with other electronic modules, such as an engine electronic module, it may be advantageous if for a controlled automatic shifting operation of the gear ratio executed with an actuator(s), at least during its initial phase, the speed of the drive unit is purposely decreased by controlling, for example, an engine electronic module via the control unit, and during a second phase the engine speed of the drive unit is purposely increased by controlling the drive unit via the control unit up to a target speed, wherein the target speed is derived from at least one wheel rotation speed value and the gear ratio of the power train and the gear ratio of the transmission.

It may also be advantageous if the wheel rotation speed values are determined from a wheel rotation speed sensor(s).

It is particularly advantageous if the wheel rotation speed sensor(s) is associated with an anti-blocking system (ABS).

Accordingly, it may be advantageous to another object of the invention to provided a method for controlling a torque transmitting system and a transmission in the power train of an automobile comprising an engine, a torque transmitting system and a transmission, a control unit and at least one actuator for operating the torque transmitting system and for shifting the gear ratio of the transmission, wherein the control unit controls an actuator(s) for operating the torque transmitting system and for shifting the gear ratio of the transmission. The control unit is in signal-transmitting communication with a sensor(s) and, if necessary, with other electronic units, so that when a signal is present indicating the intent to shift, the control unit controls an engine electronics in such a way that the engine speed is reduced, that the torque transmitting system at an at least partially reduced engine speed is disengaged through an actuator(s), that the control unit executes the shifting operation with an actuator(s) and controls the engine electronics substantially before or after the shifting operation ends, but at least substantially before the torque transmitting system engages, such that the engine speed is regulated to a target speed which essentially matches the input speed of the transmission, wherein the target speed is derived from at least one wheel rotation speed value and the gear ratio of the power train and the gear ratio of the transmission.

It may also be advantageous in a method of the invention if the input speed of the transmission is calculated by using speed values and gear ratio values of the power train. It may furthermore be advantageous to measure the input speed of the transmission is measured with a sensor.

According to a concept of the invention, it may be advantageous if the presettable desired value for controlling the engine speed is essentially the input speed of the transmission.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 3b is a schematic circuit diagram illustrating the block controller shown in FIG. 3a;

DETAILED DESCRIPTION OF THE PRESENTLY PREFERRED EMBODIMENTS

Figure 1:
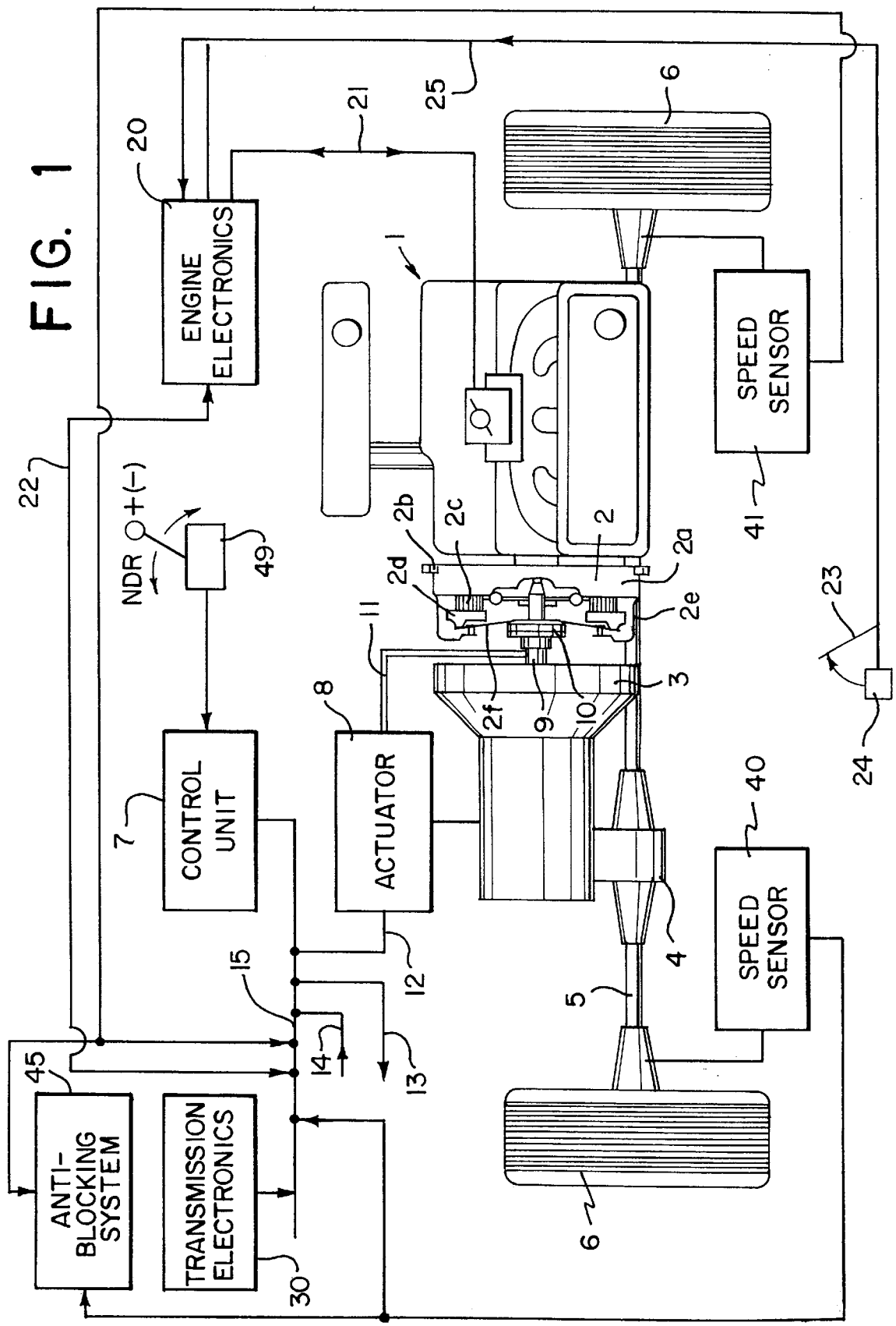
FIG. 1 is a schematic representation of a power train of an automobile.

FIG. 1 shows a schematic representation of a power train of an automobile with a drive unit 1, such as an internal combustion engine or a motor, a torque transmitting system 2, a transmission 3 and a differential 4, axle drive shafts 5 and wheels 6 driven by the axle drive shafts. On the wheels, there may be disposed speed sensors 40, 41 for sensing the speed of the wheels. These speed sensors may functionally also be associated with other electronic units, such as an anti-blocking system (ABS). The drive unit may also be a hybrid drive comprising, for example, an electric motor, and a free-wheeling flywheel.

The torque transmitting system 2 is constructed as a friction clutch wherein the torque transmitting system may also be constructed as a magnetic powder coupling, a multi-disk clutch or as a torque converter with torque converter bypass clutch or any other clutch.

There is also shown a control unit 7 and, schematically, an actuator 8. The friction clutch may also be a self-adjusting clutch which automatically compensates for wear.

The torque transmitting system 2 is mounted on or connected to a flywheel 2a wherein the flywheel may be a dual flywheel having a primary mass and secondary mass, with damping means disposed between the primary mass and the secondary mass, and a starter gear 2b attached to the flywheel. The clutch includes a clutch disk 2c with friction pads and a pressure plate 2d as well as a cover plate 2e and a disk spring 2f. The self-adjusting clutch also includes means for enabling adjustment or compensation for wear by using a sensor, such as a sensor indicating force or travel, which can detect a situation where an adjustment would be required and where such adjustment, if detected, could also be performed.

The torque transmitting system is controlled through a clutch release lever 9, for example a pressure-actuated, e.g. hydraulic, central clutch release lever, wherein the clutch release lever may support a release bearing 10 for engaging and disengaging the clutch. The clutch release lever may also be a mechanical release device which controls, activates or energizes a release bearing or an equivalent element.

The actuator 8, or actuating unit, controls via a pressure line 11 or pressure transmission line, such as a hydraulic line, the pressure-actuated, for example hydraulic, central clutch release lever for engaging or disengaging the clutch. The actuator 8, by way of its output element(s) furthermore causes the transmission to shift, whereby, for example, a central selector shaft of the transmission is operated by the output element(s). The actuator therefore causes transmission-internal shifting elements of the transmission to engage, disengage or shift gears or gear ratios, such as a central selector shaft or sliding selector shafts or other shifting elements.

The actuator 8 may also be constructed or planned as drum control actuator located inside the transmission. The drum controller is coupled to the rotation of the transmission and operates elements guided by guide means, such as shifting elements, for shifting gears. In addition, the actuator for shifting gears may also include the actuator for operating the torque transmitting system, whereby in this case a connection to the clutch release lever is required.

The control unit 7 is connected to the actuator via the signal link 12 for exchanging, transmitting and querying control signals and/or sensor signals or signals reflecting the operational state. In addition, the signal links 13 and 14 (for signal transmitting communication) provides at least temporary signal connections between the control unit and other sensors or electronic units. Such other electronic units may include, the engine electronics, an anti-blocking system electronics or an anti-slip control electronics. Other sensors may be sensors for or detecting the operating state of the vehicle in general, such as engine speed or wheel rotation speed sensors, throttle position sensors, gas pedal sensors or other sensors. The signal link 15 provides a link to a data bus, for example a CAN bus, which provides system data of the vehicle or of other electronic units, because the electronic units are in general networked via computers.

Gearshifting of an automatic transmission can be initiated by the driver of the vehicle with the driver providing a signal for up-shifting or down-shifting by way of a shift or a actuating lever 49. In addition, a signal may be provided via an electronic shift lever indicating into which gear the transmission should shift. An automatic transmission may also execute a gear shift automatically on the basis of, for example, characteristic values, characteristic functions or mapping and on the basis of sensor signals at certain predisposed points, without requiring an input from the driver.

The vehicle is preferably provided with an electronic gas pedal 23 or load lever, wherein the gas pedal 23 controls a sensor 24 for enabling control of, for example, the fuel supply, ignition timing, injection time or the throttle position by the engine electronics 20 via the signal link 21 of the motor 1. The electronic gas pedal 23 with the sensor 24 is in signal-transmitting communication with the engine electronics 20 via the signal link 25. The engine electronics 20 is in signal communication with the control unit 7 via the signal link 22. In addition, the transmission electronics 30 may also be in signal transmitting communication with the units 7 and 20. Advantageous in this case is a throttle position controlled by an electric motor, wherein the motor electronics controls the position of the throttle. Systems of this type eliminate or obviate a direct mechanical link to the gas pedal.

FIG. 1 furthermore shows wheel rotation speed sensors 40, 41 in signal-transmitting communication with the control unit. Advantageously, there is provided a wheel rotation speed sensor on each wheel and said signals arrive at or are transmitted to the control unit directly or in already processed form. It may also be advantageous if the wheel rotation speed values are provided by the wheel rotation speed sensors 40, 41 forming part of an anti-blocking system 45 having its own control unit. Thereby, the invention advantageously obviates the requirement for additional sensors, such as a transmission speed sensor.

A target speed for the engine speed to which the engine speed is controlled or controllably reduced or increased, can be calculated from at least one wheel rotation speed value obtained from at least one wheel rotation speed sensor, taking into consideration the gear ration of the power train between the input of the transmission and the wheels. The speed sensor values of the individual sensors may also be averaged for calculating the speed for providing the highest possible accuracy.

The wheel rotation speed values may also be transmitted directly from a control unit of an anti-blocking system (ABS) to the control unit 7. In this way, the information relating to the wheel rotation speed may, for example, be transmitted via a data bus, such as a CAN bus, obviating the need to install additional wheel rotation speed sensors.

Figure 2:
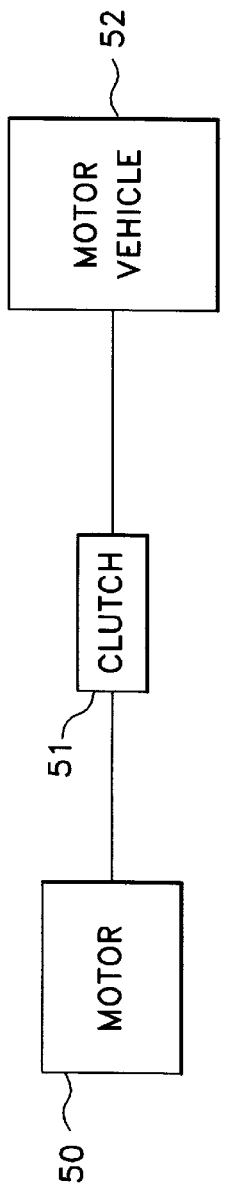
FIG. 2 is a block diagram illustrating a two-mass model for modeling the power train of a vehicle.

FIG. 2 is a two-mass model for modeling the power train of the vehicle, wherein the mass 50 is considered the rotational mass of the motor and the mass 52 is considered the rotational mass of the rest of the power train and the vehicle, respectively, and the clutch 51 is interposed in the power train between the rotational mass 50 and the rotational mass 52. This model can be used as basis for a simplified interpretation of the shifting and coupling operation. In a shifting operation, the clutch 51 is opened and the two-mass model becomes a one-mass model. The power train located behind the clutch is disengaged by opening the clutch.

Figure 3A:
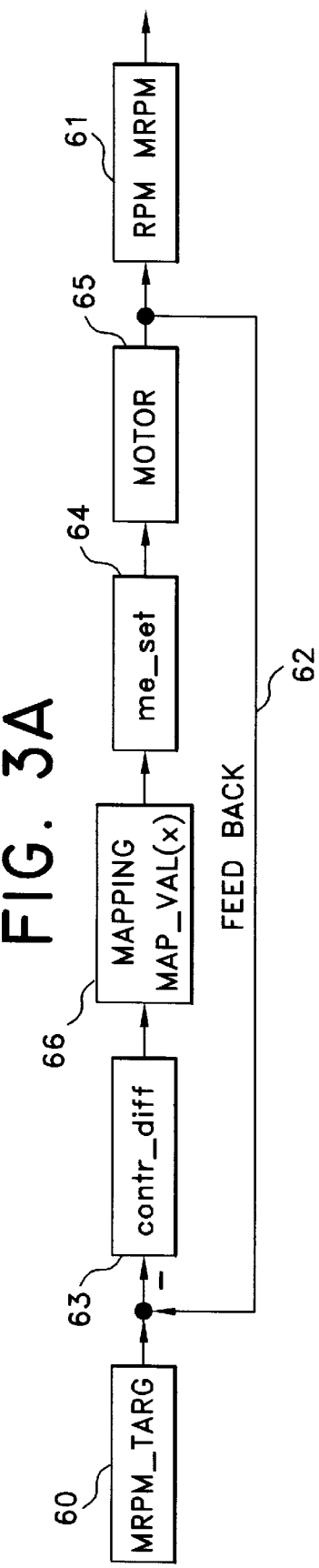
FIG. 3a is a block diagram illustrating a controller for controlling the engine speed.

FIG. 3a is a block diagram of a controller for controlling the engine speed MRPM during a shifting operation, such as up-shifting or down-shifting, wherein the engine target speed MRPM_TARG 60 is selected as preset value or desired value; the engine speed MRPM 61 is used as the controlled variable which is used via feed back 62 for establishing the control difference Contr_Diff 63. The desired engine value me_set is applied as controlling variable 64. The motor 65 is the control system. The controller 66 may be implemented, for example, by a mapping MAP_VAL(x), wherein the argument x of the mapping MAP_VAL(x) is the control difference Contr_Diff 63.

Figure 3B:
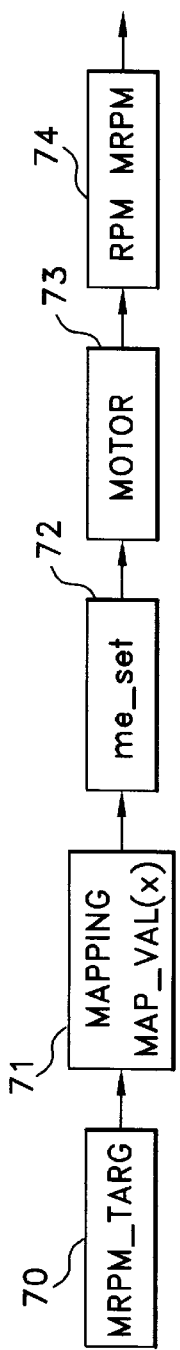

FIG. 3b is a block diagram of a controller according to the schematic circuit diagram of a controller of FIG. 3a. The MRPM_TARG 70 is used as input variable of the control block 71. The block 71 is implemented as a mapping MAP_VAL(x), wherein as in FIG. 3a, also a characteristic curve or characteristic values or functions may be used for calculating or determining the desired engine value me_set as a function of the input value. The controlling variable is the desired engine value me_set 72, wherein the motor 73 is used as control system and the engine speed MRPM 74.

The control unit 66, 71 may be configured as a control systems operating by way of functional dependence or with mapping or characteristic curves. The preset control inputs are the engine target speed MRPM_TARG, with the engine speed MRPM as controlled variable.

The control process according to FIG. 3b may be provided with an adaptive process where deviation from ideal conditions are adaptively compensated over long time periods. Adaptation may be an adaptation of parameters or an adaptation of the system.

If a shifting operation is initiated by the driver via, for example, a shifter, a button or a lever, then the control unit evaluates based on the available system input values, if a shifting operation is indicated or if such an operation would result in a condition where, for example, the engine speed could reach a speed range where a limit value would be exceeded. If a shifting operation is considered "Allowed" by the control unit, then the control unit prompts the torque transmitting system to disengage and the transmittable torque is set to zero by the actuator or by an actuator.

If the condition of the control unit is such that it automatically selects and shifts the gears or gear ratios of the transmission without the active intervention from the driver, then a shifting point will be reached, based on mapping or implemented functions, where the gear or gear ratio is going to be changed. In this case, the control unit initiates disengagement of the torque transmitting system. After the torque transmitting system is disengaged at least to the point where the transmitted torque is essentially zero, then the at least one actuator for shifting the gears is actuated for the purpose of operating transmission-internal shifting elements.

Before the actual gear is disengaged for shifting into/through the neutral position of the transmission, the engine torque and/or the engine speed is purposely decreased through intervention of the control unit, so that the engine speed does not suddenly increase when the gear is disengaged and the load is removed. This reduction in the engine speed is initiated by the control unit, wherein the control unit is in signal-transmitting communication with an engine control and reduces the engine torque and/or the engine speed through the control signal of the control unit.

When the control unit indicates a shifting intent, then—in case of up-shifting, where the new gear position has a higher gear ratio in comparison with the actual gear position—the engine speed is increased to a new value depending on the new gear. The transmission input speed can be calculated using information about the newly engaged gear and the transmission gear ration in said gear and the gear ratio of the subsequent power train by way of the wheel rotation speed or averaged wheel rotation speed values, without the need to measure the transmission input speed directly. If a transmission input speed sensor is available, then that transmission input speed may also be measured directly. The calculated speed of the transmission input shaft after the shifting operation is the target speed. After determining or calculating the target speed via the target gear, the engine torque is increased or decreased through active intervention by the control unit on the engine electronics, meaning that the control unit effects the engine management via the engine control for actively supplying fuel to the engine, thereby increasing the speed. This can be especially advantageously applied to vehicles with E-gas systems, wherein it is a characteristic feature of the E-gas systems that the gas pedal is operating as an electronic transmitter which is in signal-transmitting communication with the engine electronics, with the engine electronics in turn connected to a throttle valve actuator operated by an electric motor for adjusting the throttle position through said electric motor. Electronic fuel injection may also be advantageous. In this way, the mechanical link between the gas pedal/load lever and the internal combustion engine is replaced by an electronic path, with the control electronics connected in series with the engine control and controlling the operation of actuators, for example, on the internal combustion engine.

As a result of the intervention of the control unit in the engine management of the engine electronics, the engine speed is purposely increased, such as controlled, to the target speed, before the torque transmitting system is at least partially re-engaged by controlling at least one actuator for operating the torque transmitting system.

Figure 4:
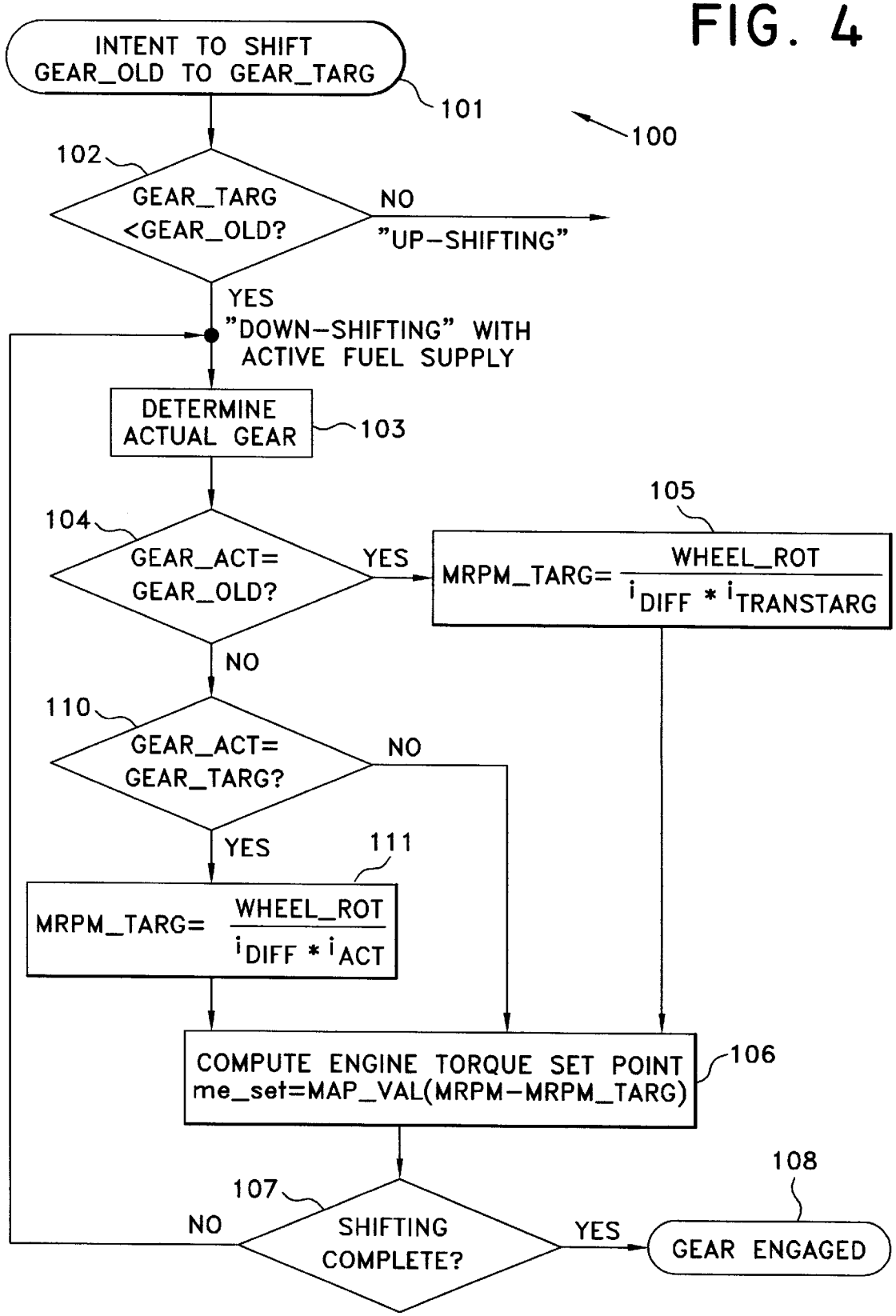
FIG. 4 is a block diagram illustrating a shifting process.

FIG. 4 shows a block diagram for the use of a device and for describing a method of the invention for actively supplying fuel to, i.e. increasing the speed of, the engine when the transmission is down-shifted. Correspondingly, the speed can be purposely decreased when the transmission is up-shifted.

In block 101, a shifting intent is initiated or recognized by a shifting intent sensor, whereby the control unit initiates a gear shifting operation from an engaged gear GEAR_OLD to a new gear GEAR_TARG. In block 102, there is a query if the target gear GEAR_TARG is a lower gear than the actual gear GEAR_OLD, i.e. if the target gear ratio is greater than the actual gear ratio. If this is not the case, then the operation is an up-shift. If the query in block 102 is true, then the new actual gear is determined in block 103. The determination of the new gear may, for example, be carried out by a sensor detecting the possible gear positions. Another possibility may be to calculate the gear ratio from speed values, whereafter the gear position can be determined from the calculated gear ratio.

In block 104 there is queried if the new actual gear GEAR_ACT is the same as the old gear GEAR_OLD. If this is the case, then the engine target speed MRPM_TARG is calculated from the wheel rotation speed, wherein the wheel rotation speed is divided by the gear ratio of the differential $i_{DIFF}$ and the target transmission gear ratio $i_{TRANSTARG}$.

$$\text{MRPM\_TARG} = \text{WHEEL\_ROT} / (i_{DIFF} * i_{TRANSTARG})$$

The engine target speed MRPM_TARG is calculated in block 105, whereafter the desired engine torque value me_set is derived from a mapping value MAP_VAL(x) which is dependent on the difference between the engine speed MRPM and the target engine speed MRPM_TARG.

$$\text{me\_set} = \text{MAP\_VAL}(\text{MRPM} - \text{MRPM\_TARG}).$$

Subsequently, in block 107 is queried if the shifting operation has been terminated, i.e. if the transmission-internal shifting elements have reached their final position. This may be detected, for example, by limit switches or by the gear recognition sensor. If this is the case, then the gear in block 108 is considered as engaged and the process is terminated. If during query 107 the shifting operation has not yet terminated, then the process continues with block 103 via path 109. If the query result in block 107 is false, then the new actual gear is set as target gear in block 110 or it is queried, if this is the case. If the answer is negative, then the desired engine torque value is subsequently determined in block 106. If the new actual gear is the target gear of block 101, then the engine target speed is determined from the wheel rotation speed divided by the differential gear ratio and also divided by the actual transmission gear ratio. This operation is performed in block 110. Subsequently, the engine torque set point is determined in block 106 and, as already described before, after the desired engine torque value has been determined, the process continues in block 107. According to the FIGS. 3a, 3b, the desired engine torque value is used during the control process for controlling the engine speed.

Figure 5:
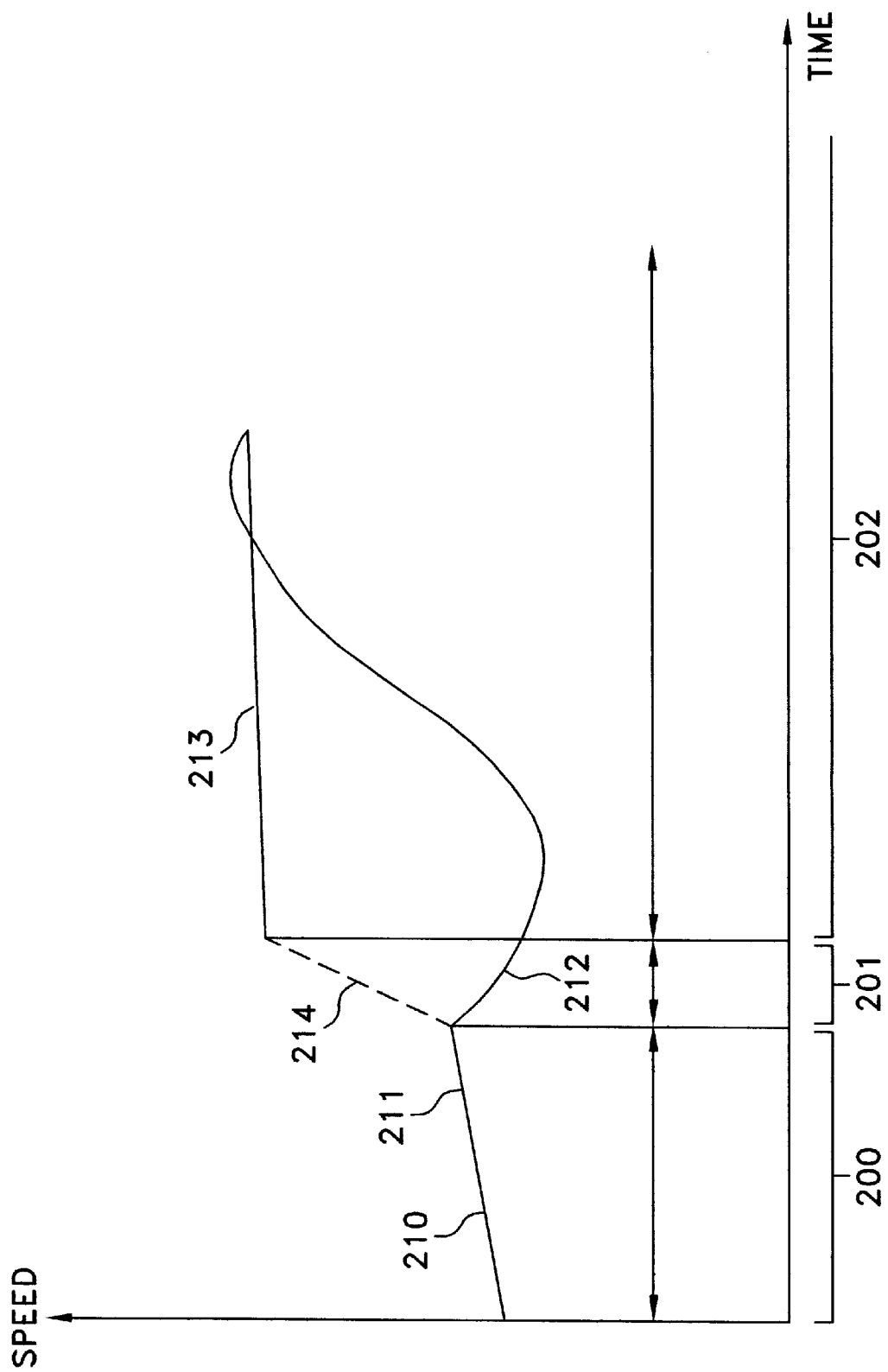
FIG. 5 is a diagram illustrating the speed as a function of time.

FIG. 5 shows a diagram for illustrating how the method of the invention is carried out with the inventive device. In the diagram of FIG. 5, there is shown the speed as a function of time, with the time domain separated into three phases. Phase 1 is labeled 200, phase 2 is labeled 201, and phase 3 is labeled 202. In phase 1, the engine speed 210 and the transmission input speed 211 are essentially equal, whereby both speeds increase slightly from the beginning of time interval 200 to the end of time interval 200. The vehicle is here accelerated by a pedal value, such as a load lever value, greater than zero.

When the intent to shift gears is indicated, the engine torque or the engine speed is controllably reduced and the clutch opened at least to a point where the transmitted torque is essentially zero. The engine slows down, with the clutch open, as a result of the ensuing engine drag torque and the engine speed decreases in the interval 201; this event is labeled 212. The control unit is now able to intervene in the same manner as in the case of down-shifting for a E-gas system, assuming that a/no transmission input sensor is employed.

If, for example, in the case of down-shifting, there is an effect on the engine electronics, i.e. actively supplying fuel to the engine or increasing the engine speed, then the following advantages arise: a shorter shifting time, less wear and an improved comfort level. The shifting time can be shortened in that after the shifting operation the engine speed is automatically and controllably matched. Wear is decreased in that the time interval during which slippage between the input and output elements of the torque transmitting system occurs, is shorter than with other methods. The improved comfort can be attributed to the absence of unintended braking and acceleration periods of the vehicle as a result of engagement of the clutch.

FIG. 5 does not show a transmission input speed value in phase 201, since the shifting operation takes place during that time, and for this reason, because the transmission gear is not engaged, the transmission input speed value cannot be calculated from, for example, the wheel rotation speed values.

If the gear is engaged in phase 202, then the transmission input speed value, as shown in 213, can again be computed. If a transmission input speed value sensor is employed, then the dashed line 214 in phase 201 is obtained which corresponds to the change of the transmission input speed value from interval 200 to interval 202.

If the method or the device, respectively, of the invention are implemented without using a transmission input speed value sensor, then the desired engine torque value can be provided to the engine control for the purpose of increasing the speed. The functional dependence holds that the engine torque desired engine torque value me_set is a function of the engine speed and of the target engine speed, wherein the engine speed is the actual engine speed and the target engine speed is the desired value for the engine speed. The desired engine torque value for increasing the engine speed is derived as a function of the actual engine speed and/or the so-called target engine speed. The actual engine speed may be provided as a filtered and consequently time-delayed speed determined from the measured engine speed. The engine speed is determined as a function of the gear and target gear, respectively, with a distinction being made between the three phases 200 to 202. In phase 200 the old gear is engaged, in phase 201 no gear is engaged and in phase 202 the new gear is already engaged in the transmission.

During phase 1, the target engine speed is computed from the wheel rotation speed as follows:

$$\text{MRPM\_TARG} = \text{WHEEL\_ROT} / (i_{DIFF} * i_{TRANSTARG}),$$

wherein MRPM_TARG is the target engine speed, WHEEL_ROT is, for example, the arithmetic mean of the wheel rotation speed values of the axle drive shaft, $i_{DIFF}$ is equal to the differential gear ratio and $i_{TRANSTARG}$ is the gear ratio of the target gear. During the second phase (201), the value from the previous phase (200) is retained, and in the third phase (202) the following relation holds:

$$\text{MRPM\_TARG} = \text{TIN\_RPM} = \text{WHEEL\_ROT} / (i_{DIFF} * i_{ACT}),$$

wherein MRPM_TARG is equal to the target engine speed, TIN_RPM is equal to the transmission input speed value, WHEEL_ROT is, for example, the arithmetic mean of the wheel rotation speed values of the axle drive shaft, $i_{DIFF}$ is equal to the differential gear ratio and $i_{ACT}$ is equal to the gear ratio of the actual gear.

Conventional control methods can be employed for providing the functional relation between the desired engine torque value and the engine speed or the target engine speed, respectively. The necessary basic equations can be illustrated by a mechanical model, as shown in FIG. 2. The present two-mass model of FIG. 2 is reduced to a one-mass model during shifting (clutch open). For the engine side holds:

$$M_{Ind} - M_{Drag} - M_{Serv} = J * d\omega/dt,$$

wherein $M_{Ind}$ is the induced engine torque, $M_{Drag}$ is the engine drag torque and $M_{Serv}$ is the torque consumed by ancillary service equipment, J is the engine inertia, $d\omega/dt$ is the angular acceleration of the engine, which means that the induced engine torque $M_{Ind}$ (engine speed or angular frequency of the engine) available for increasing the speed is reduced by the contributions engine drag torque $M_{Drag}$ and the service torque $M_{Serv}$. The service torques are, for example, the result of compressor losses in the air conditioning unit and in other ancillary equipment. These moments are determined by adaptation. It is the object of the control algorithm to determine the desired engine torque value in such a way that the actual value of the engine speed lies within a certain range. This can be implemented by, for example, mapping, such as a one-dimensional or multi-dimensional map, such that me_set=MAP_VAL(control_diff), wherein the control error is equal to the engine speed minus the target engine speed:

control_diff=MRPM-MRPM_TARG

MAP_VAL is a map which may be one-dimensional or multi-dimensional and control_diff is the difference between the engine speed minus the target engine speed according to FIGS. 3a and 3b.

This method performs the calculation of the desired engine torque value me_set from the substituted variable control_diff instead of the independent variables engine speed (actual value) and the target engine speed. This method has the advantage that the engine speed is prevented from overshooting or that the computation time is minimized or that, for example, the code for implementing the method in a microprocessor is minimized. Furthermore, the method does not have to explicitly depend on the gear, since different gears may result in different control errors (control differences).

In FIG. 5, there is shown, for example, an idealized torque dependence when applying the method of the invention, wherein the shifting times may be shortened considerably, the wear of the clutch pad is reduced and the comfort may improve significantly.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An apparatus for controlling a torque transmitting system and a transmission in a power train of an automobile, the power train comprising an engine having variable RPM, a torque transmitting system, a transmission including gear ratios, a control unit, at least one actuator, at least one electronic module comprising an engine electronic module and said control unit controls said engine electronic module to influence the engine RPM; and at least one sensor comprising a rotational-speed sensor;

said torque transmitting system being operatively connected to a drive shaft to two wheels and wherein the rotational speed sensor is connected to at least one of said wheels;

said control unit controls the at least one actuator for operating the torque transmitting system and for automatic shifting operation of the gear ratios of the transmission and said control unit is in signal-transmitting communication with the rotational speed sensor and the at least one electronic module;

wherein for an automatic shifting operation of the gear ratios of the transmission by the at least one actuator the engine RPM is initially reduced to a desired RPM value by controlling the engine electronic via the control unit and subsequently the engine RPM is increased; and wherein the desired RPM value is determined from speed values derived from the rotational speed sensor and from one of the gear ratios in the transmission.

2. An apparatus according to claim 1, said transmission comprises internal shift elements and said at least one actuator imparting power onto said internal shifting elements.

3. An apparatus according to claim 2, wherein the automatic shifting operation of the gear ratios is a down-shift operation, wherein the gear ratio after the shifting is greater than before the shifting.

4. An apparatus according to claim 2, wherein the automatic shifting operation of the gear ration is an up-shift operation, wherein the gear ratio after the shifting is smaller than before the shifting.

5. An apparatus according to claim 2, wherein the reduction in the RPM is influenced before power is imparted onto said internal shifting elements.

6. An apparatus according to claim 5, said control unit indirectly controls the engine electronic module so as to influence the engine RPM.

7. An apparatus according to claim 6, wherein the at least one electronic module further comprises a transmission electronic module and said engine electronics being indirectly controlled by said transmission electronic module.

8. An apparatus according to claim 7, said engine electronic module and said transmission electronic module being in signal-transmitting communication so as to operate as master/slave modules.

9. An apparatus according to claim 1, wherein during the automatic gear shifting, said torque transmitting system is disengaged at reduced engine RPM and engaged when the RPM is increased.

10. An apparatus according to claim 1, wherein the at least one sensor comprises two wheel-rotational-speed sensors, each connected to each of said two wheels and wherein the desired RPM value is determined from averages of speed values derived from the speed sensors.

11. An apparatus according to claim 9, wherein the engine RPM is increased to a desired RPM value.

12. Apparatus according to claim 10, wherein the engine RPM is utilized as a control variable and said control variable is utilized as a control output by the control unit for controlling the desired engine torque.

13. An apparatus according to claim 12, said control unit determining the desired engine torque value by referring to look-up data and wherein the desired engine torque value is controlled in such a way as to substantially match the engine RPM to the transmission input RPM.

14. An apparatus according to claim 12, said control unit determines the desired value of the engine torque from an input value based on preset functions and on the pre-settable desired value.

15. A method for controlling a torque transmitting system and a transmission in the power train of an automobile comprising an engine, a torque transmitting system, a transmission including an automatic gear shifting operation, a control unit, at least one actuator, at least one electronic module and at least one wheel rotational speed sensor, comprising the steps of controlling with the control unit the actuator for operating the torque transmitting system and for shifting the gear ratio of the transmission;

providing a signal-transmitting communication between the control unit and the at least one sensor and with the electronic module;

upon indicating an intent to shift, determining engine RPM values with the wheel rotational speed sensor and transmitting the determined RPM values to the control unit for causing the engine RPM to be reduced for reducing the engine RPM;

disengaging the torque transmitting system when the engine RPM is at least partially reduced;

causing the control unit to execute the shifting operation.

16. A method according to claim 15, further comprising the step of preparing for a down-shifting by increasing the engine RPM before engaging the torque transmitting system to an input RPM of the transmission.

17. A method according to claim 15, further comprising the step of preparing for an up-shifting by adjusting the engine RPM before engaging the torque transmitting system to an input transmission RPM.

18. A method according to claim 17, wherein the input RPM of the transmission is determined by using RPM values and gear ratios of the power train.

19. A method according to claim 17, wherein the input transmission RPM is measured with a sensor.

20. A method according to claim 19, wherein a pre-settable desired value for controlling the engine RPM is substantially equal to the input transmission RPM.

* * * * *